Aug. 9, 1927.
C. SCHAEFFER
1,638,750
STEERING DEVICE FOR MOTOR VEHICLES
Filed Feb. 19, 1927
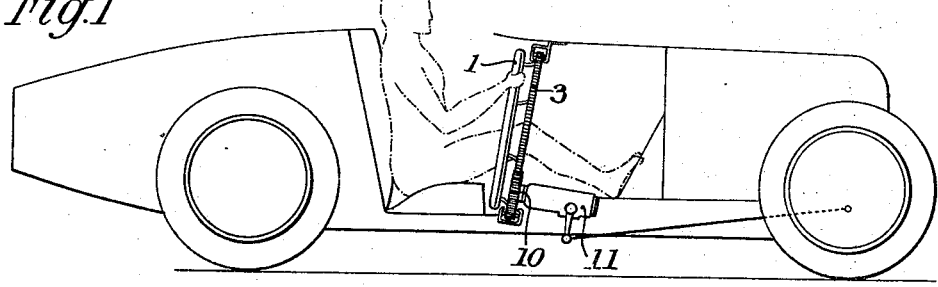
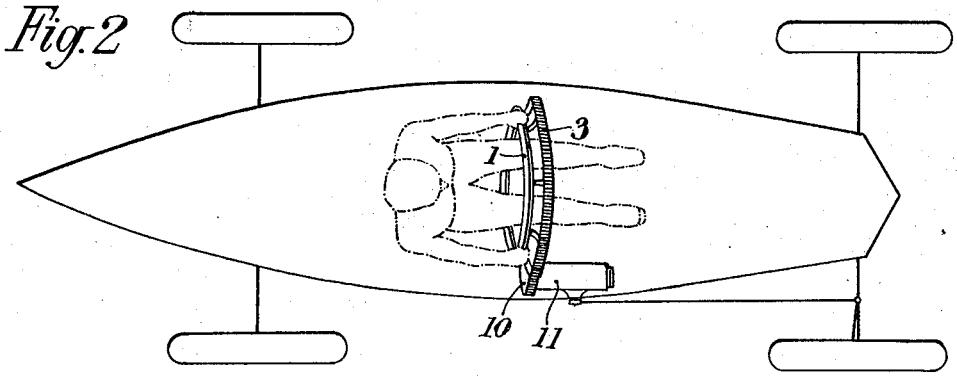
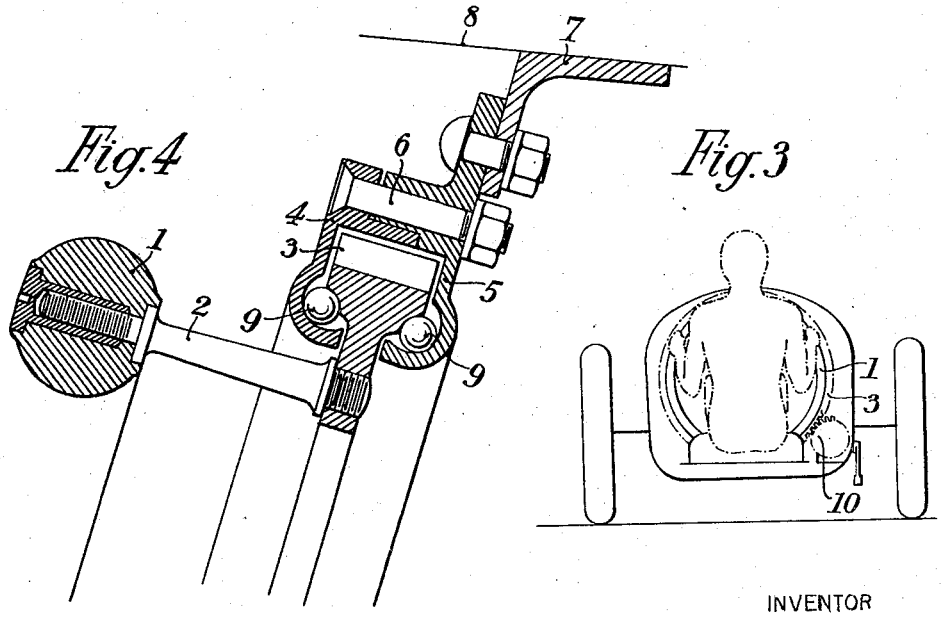
INVENTOR
CHARLES SCHAEFFER
BY
-ATTORNEY Patented Aug. 9, 1927.

1,638,750

UNITED STATES PATENT OFFICE.

CHARLES SCHAEFFER, OF PARIS, FRANCE.

STEERING DEVICE FOR MOTOR VEHICLES.

Application filed February 19, 1927, Serial No. 169,581, and in France March 6, 1926.

According to customary practice, the steering wheel for motor vehicles is disposed above the driver's legs, and for this reason, chiefly in the high-speed types of motor vehicle, this reduces the field of vision upon the road, and the resistance to the travel of the vehicle is increased due to the portion of the steering wheel which extends above the vehicle body.

The present invention relates to a steering wheel which may be entirely contained in the vehicle body while at the same time it can be given a large diameter.

The said steering wheel is unprovided with arms and consists of a large ring through which the driver's legs may be inserted; it is provided with a toothed ring which is guided in the vehicle body in such manner as to be properly rotatable, and the said toothed ring engages a pinion which controls the steering shaft, by an endless screw or other means.

The appended drawings show by way of example an embodiment of the invention.

Fig. 1 is a side elevation of the vehicle, with a part of the vehicle body removed to show the device.

Fig. 2 is a corresponding plan view and Fig. 3 an end view.

Fig. 4 is a partial vertical section of the steering wheel on a larger scale.

The driver is seated at the middle of the vehicle and his legs extend through the large ring 1 which forms the steering wheel, this being connected by the uprights 2 with the toothed ring 3 which is rotatable in a guide consisting of two members 4 and 5 maintained by the bolts 6, one of the said members, 5, being secured by an angle bracket 7 to the vehicle body 8.

The said guide may be entirely circular or may consist only of a certain number of sectors spaced around the toothed ring 3 whereby the latter will be properly maintained and centered.

To facilitate the rotation of the said toothed ring, the members 4 and 5 comprise grooves containing the balls 9; suitable rollers might be employed for the same purpose.

A pinion 10 is keyed to the shaft of the endless screw of the usual steering gear 11, and said pinion engages the gear wheel 3.

In this manner the vehicle can be steered as usual by means of the wheel 1.

It has been supposed in the drawings that the steering gear 11 is situated below and to the right of the steering wheel, but it is obvious that the said steering gear may be placed in any other suitable position according to the arrangement of the several parts of the vehicle.

The pinion 10 may be optionally enclosed in a casing which can be screwed for instance to the member 5.

Having thus described my apparatus, what I claim as new therein, and my own invention is:—

1. In a steering device for motor vehicles provided with pivoted vehicle wheels, the combination of a steering wheel and means connecting the said steering wheel with the controlling mechanism of said pivoted vehicle wheels, said steering wheel consisting of a large ring, without arms, so disposed that the driver of the vehicle may place his legs through the said ring.

2. In a steering device for motor vehicles provided with pivoted vehicle wheels, the combination of a steering wheel and means connecting the said steering wheel with the controlling mechanism of said pivoted vehicle wheels, said steering wheel consisting of a large ring, without arms, so disposed that the driver of the vehicle may place his legs through the said ring, a guiding ring for the said steering wheel, means rigidly connecting the said guiding ring with said steering wheel, and means guiding the said ring upon the vehicle in such manner that the ring will be rotatable.

3. In a steering device for motor vehicles provided with pivoted vehicle wheels, the combination of a steering wheel and means connecting the said steering wheel with the controlling mechanism of said pivoted vehicle wheels, said steering wheel consisting of a large ring, without arms, so disposed that the driver of the vehicle may place his legs through the said ring, a guiding ring for the said steering wheel, said ring being provided with gear teeth, means rigidly connecting the said guiding ring with the said steering wheel, means guiding the said ring upon the vehicle in such manner that the ring will be rotatable, a controlling shaft in the longitudinal position on said vehicle and connected with the steering mechanism, and a pinion mounted on said shaft, said pinion coacting with the toothed portion of the said ring.

4. In a steering device for motor vehicles provided with pivoted vehicle wheels, the combination of a steering wheel and means connecting the said steering wheel with the controlling mechanism of the said pivoted vehicle wheels, said steering wheel consisting of a large ring, without arms, so disposed that the driver of the vehicle may place his legs through the said ring, a guiding ring for the said steering wheel, uprights rigidly connecting the said guiding ring with said steering wheel, and ball or roller bearings forming a circular guiding device for the said ring upon the vehicle.

5. In a steering device for motor vehicles provided with pivoted vehicle wheels, the combination of a steering wheel and means connecting the said steering wheel with the controlling mechanism of the said pivoted vehicle wheels, said steering wheel consisting of a large ring, without arms, so disposed that the driver of the vehicle may place his legs through the said ring, a guiding ring for the said steering wheel, uprights rigidly connecting the said guiding ring with said steering wheel, and ball or roller bearings which constitute a circular guide consisting of a plurality of sectors spaced upon the periphery of the said ring.

In testimony whereof, I have hereunto affixed my signature.

CHARLES SCHAEFFER.